US012638425B2

(12) United States Patent
Tanaka

(10) Patent No.: US 12,638,425 B2
(45) Date of Patent: May 26, 2026

(54) PIPE FOR CHROMATOGRAPH AND METHOD OF MANUFACTURING PIPE FOR CHROMATOGRAPH

(71) Applicant: SHIMADZU CORPORATION, Kyoto (JP)

(72) Inventor: Shinji Tanaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 308 days.

(21) Appl. No.: 18/607,434

(22) Filed: Mar. 16, 2024

(65) Prior Publication Data

US 2024/0319149 A1 Sep. 26, 2024

(30) Foreign Application Priority Data

Mar. 23, 2023 (JP) ................................. 2023-046752

(51) Int. Cl.
| | |
|---|---|
| *G01N 30/02* | (2006.01) |
| *B21C 37/16* | (2006.01) |
| *G01N 30/38* | (2006.01) |
| *G01N 30/60* | (2006.01) |
| *G01N 37/00* | (2006.01) |

(52) U.S. Cl.
CPC ......... *G01N 30/6065* (2013.01); *G01N 30/38* (2013.01); *B21C 37/16* (2013.01); *G01N 2030/027* (2013.01); *G01N 37/00* (2013.01)

(58) Field of Classification Search
CPC ................................. B21C 37/16; B21C 37/18
See application file for complete search history.

(56) References Cited

U.S. PATENT DOCUMENTS 4,726,878 A * 2/1988 Gross ......................... C23F 1/02
                                                    216/49
2002/0108684 A1 * 8/2002 Quick ..................... C22C 30/00
                                                    148/527

FOREIGN PATENT DOCUMENTS

JP       2008-224559 A       9/2008

OTHER PUBLICATIONS

VICI Jour. VICI Jour Full Catalog. Valco Instruments Co. Inc., Feb. 2, 2021, https://www.vici.com/catalog/VICI_Jour_Full-Catalog_02-02-21.pdf.*

* cited by examiner

*Primary Examiner* — Herbert K Roberts
(74) *Attorney, Agent, or Firm* — Renner, Otto, Boisselle & Sklar, LLP

(57) ABSTRACT

A pipe for a chromatograph includes a thin portion and a thick portion. The thin portion extends in one direction. The thick portion is located at an end portion of the thin portion in the one direction. The thin portion and the thick portion are integrally formed of a single member. The outer diameter of the thin portion is smaller than the outer diameter of the thick portion. The pipe is used in a chromatograph.

7 Claims, 4 Drawing Sheets

PIPE FOR CHROMATOGRAPH AND METHOD OF MANUFACTURING PIPE FOR CHROMATOGRAPH

BACKGROUND

Technical Field

The present disclosure relates to a pipe for a chromatograph and a method of manufacturing the pipe for a chromatograph.

Description of Related Art

A chromatograph has been known as an analysis device that separates a substance included in a sample into different components for measurement. For example, in a liquid chromatograph device described in JP 2008-224559 A, a sample that is to be analyzed and that has been supplied by an autosampler is supplied to a separation column together with an eluent that has been supplied by an eluent pump. The sample that has been introduced into the separation column is eluted into components according to differences in chemical property or composition and detected by a detector.

SUMMARY

Each unit such as the eluent pump, the autosampler, the separation column and the detector is provided with a connection port for a pipe. Therefore, units are connected to each other with use of a pipe having an outer diameter that fits the connection port. Here, the diameter of the connection port of a unit is relatively large. Therefore, a pipe having a large outer diameter is used for connection between units. However, the flexibility of the pipe having a large outer diameter is low. Further, once the pipe is bent, the pipe is permanently bent (is plastically deformed.) Thus, the handleability of the pipe is degraded. As such, it is required that the handleability of a pipe for a chromatograph is improved at low cost.

An object of the present disclosure is to provide a pipe, which has the handability that can be improved at low cost, for a chromatograph and a method of manufacturing the pipe for a chromatograph.

One aspect of the present disclosure relates to a pipe for a chromatograph, the pipe being used in a chromatograph, that includes a thin portion extending in one direction, and a thick portion located at an end portion of the thin portion in the one direction, wherein the thin portion and the thick portion are integrally formed of a single member, and an outer diameter of the thin portion is smaller than an outer diameter of the thick portion.

Another aspect of the present disclosure relates to a method of manufacturing a pipe for a chromatograph, the pipe being used in a chromatograph, that includes the steps of forming a mask at an end portion of a cylindrical member extending in one direction and reducing a thickness of the cylindrical member except for the end portion by a predetermined amount by etching the cylindrical member.

With the present disclosure, it is possible to improve handleability of the pipe for a chromatograph.

Other features, elements, characteristics, and advantages of the present disclosure will become more apparent from the following description of preferred embodiments of the present disclosure with reference to the attached drawings.

DETAILED DESCRIPTION

(1) Configuration of Chromatograph

Figure 1:
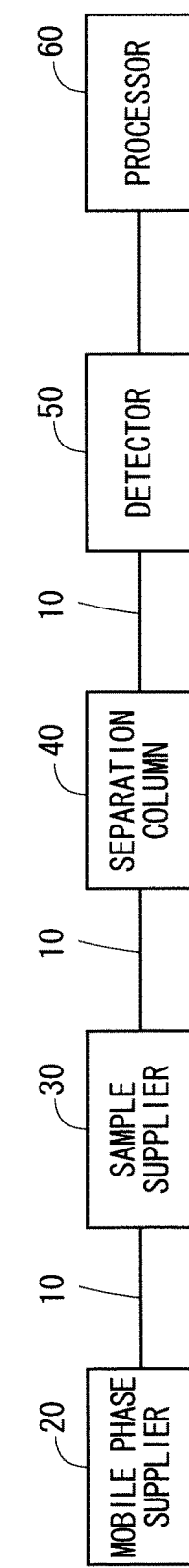
FIG. 1 is a block diagram showing the configuration of a chromatograph including pipes according to one embodiment of the present disclosure.

A pipe for a chromatograph (hereinafter simply referred to as a pipe) and a method of manufacturing the pipe for a chromatograph, according to embodiments of the present disclosure, will be described below in detail with reference to the drawings. FIG. 1 is a block diagram showing the configuration of a chromatograph including pipes according to one embodiment of the present disclosure. As shown in FIG. 1, in the present example, the chromatograph 100 is a liquid chromatograph (LC), and includes a plurality of pipes 10, a mobile phase supplier 20, a sample supplier 30, a separation column 40, a detector 50 and a processor 60.

The plurality of pipes 10 connect the mobile phase supplier 20, the sample supplier 30, the separation column 40 and the detector 50 to one another. Hereinafter, each of the mobile phase supplier 20, the sample supplier 30, the separation column 40 and the detector 50 is referred to as an LC unit. Each LC unit has a circular connection port for connection of the pipes 10. The diameter of the connection port is slightly larger than 1.6 mm (about 1/16 inch), for example.

The mobile phase supplier 20 includes a degassing device, a liquid sending pump or a mixer, for example. The mobile phase supplier 20 sucks a liquid mobile phase from one or more mobile phase containers (not shown) and supplies the sucked mobile phase downstream through the pipe 10. The sample supplier 30 includes a sample injector, for example, and supplies a sample to be analyzed to the mobile phase that has been pumped by the mobile phase supplier 20. The sample that has been supplied by the sample supplier 30 is mixed with the mobile phase and is introduced into the separation column 40 through the pipe 10.

The separation column 40 is accommodated in a column oven (not shown) and maintained to have a predetermined constant temperature. The separation column 40 separates the sample that has been supplied by the sample supplier 30 into components according to differences in chemical property or composition. The sample that has been separated into components by the separation column 40 is introduced into the detector 50 through the pipe 10. The detector 50 detects the components into which the sample has been separated by the separation column 40 and outputs a detection signal indicating a detection intensity. The processor 60 generates a chromatogram representing the relationship between a retention time of each component of the sample and the detection intensity based on the detection signal that has been output by the detector 50.

(2) Structure of Pipe

Figure 2:
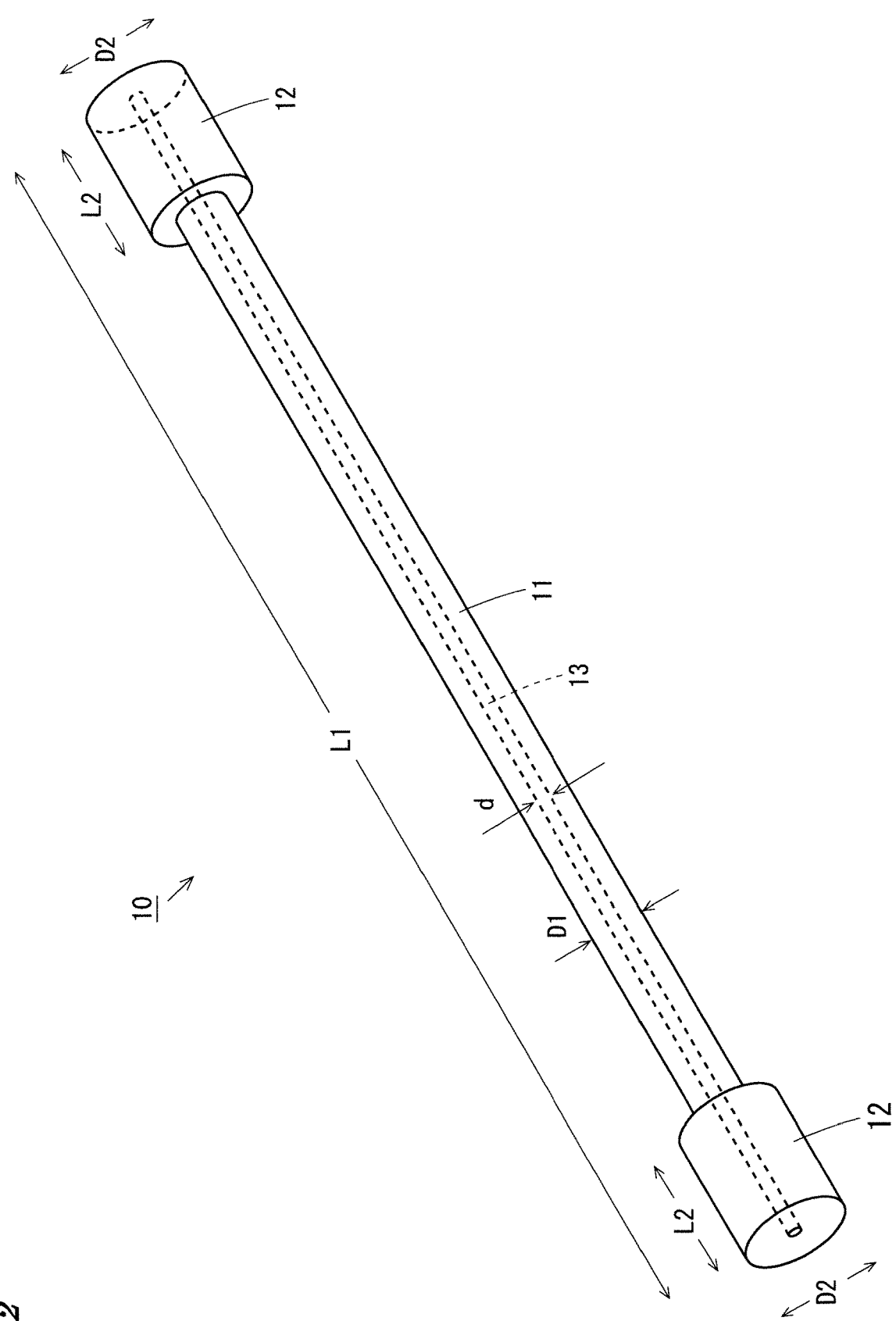
FIG. 2 is a perspective view showing the structure of the pipe.

FIG. 2 is a perspective view showing the structure of the pipe 10. As shown in FIG. 2, the pipe 10 includes a thin portion 11 and a pair of thick portions 12. The thin portion 11 and the thick portions 12 are integrally formed of a single member (a metallic material, for example) having corrosion resistance. In the present example, the thin portion 11 and the thick portions 12 are integrally formed of stainless steel. Here, the term "integrally formed" means that the thin portion 11 and the thick portions 12 are formed as a single member without being bonded, brazed, welded, etc.

The thin portion 11 extends in an axial direction. The pair of thick portions 12 are respectively located at the both end portions of the thin portion 11 in the axial direction. The length L1 of the pipe 10 in the axial direction is not less than 100 mm and not more than 2000 mm, for example. The length L2 of each of the thick portions 12 in the axial direction does not exceed the length L1, and is not less than 20 mm and not more than 200 mm, for example. Further, in the pipe 10, a circular through hole 13 penetrating the pipe 10 in the axial direction is formed. The inner diameter d of the pipe 10 (the diameter of the through hole 13) is not less than 0.05 mm and not more than 0.5 mm, for example. The inner space of the through hole 13 of the pipe 10 forms a flow path through which a mobile phase flows.

In a plane orthogonal to the axial direction, each of the thin portion 11 and the thick portions 12 has a circular cross section. The diameter D1 of the thin portion 11 is smaller than the diameter D2 of each of the thick portions 12. The diameter D1 may be not less than 0.3 times and not more than 0.7 times of the diameter D2. In the present example, the diameter D1 is 0.5 times of the diameter D2. Specifically, each of the thick portions 12 is inserted into the connection port of an LC unit. Therefore, the diameter D2 is 1.6 mm (about $\frac{1}{16}$ inch), which is slightly smaller than the diameter of the connection port, and the diameter D1 is 0.8 mm (about $\frac{1}{32}$ inch).

(3) Method of Manufacturing Pipe

Figure 3:
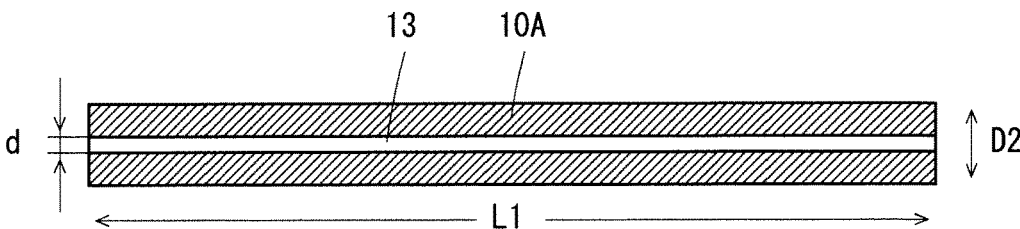
FIG. 3 is a cross sectional view for explaining one example of the step of a method of manufacturing the pipe.

FIGS. 3 to 6 are cross sectional views for explaining one example of the steps of the method of manufacturing the pipe 10. First, as shown in FIG. 3, a cylindrical member 10A extending in the axial direction is prepared. In the present example, the cylindrical member 10A is cylindrical. Further, the cylindrical member 10A is formed of SUS316, for example. The length of the cylindrical member 10A in the axial direction is L1, and the outer diameter (diameter) of the cylindrical member 10A is D2. In the pipe 10, the circular through hole 13 penetrating the pipe 10 in the axial direction is formed. The inner diameter of the cylindrical member 10A (the diameter of the through hole 13) is d.

Figure 4:
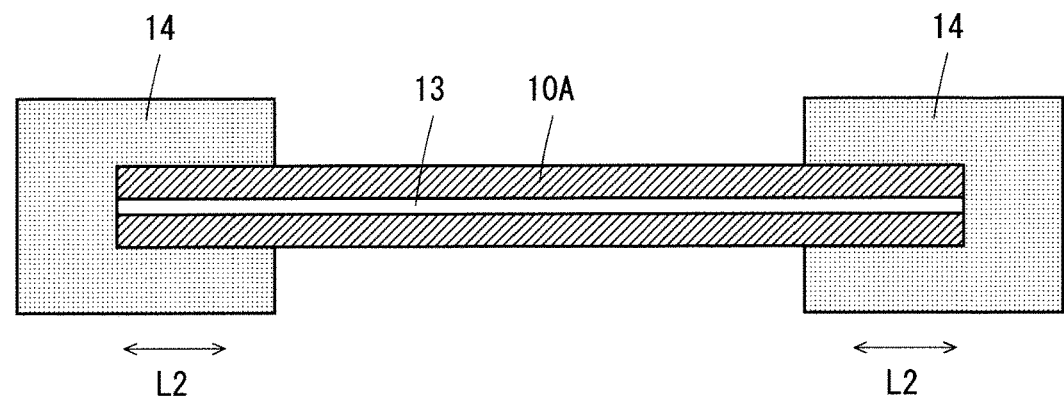
FIG. 4 is a cross sectional view for explaining one example of the step of the method of manufacturing the pipe.

Next, as shown in FIG. 4, masks 14 are formed at the both end portions of the cylindrical member 10A. The masks 14 cover the both end surfaces of the cylindrical member 10A and portions having at least the length L2 at the both end portions of the cylindrical member 10A. Subsequently, the cylindrical member 10A is etched with use of a liquid etchant. As the liquid etchant, a ferric chloride liquid is used, for example.

Figure 5:
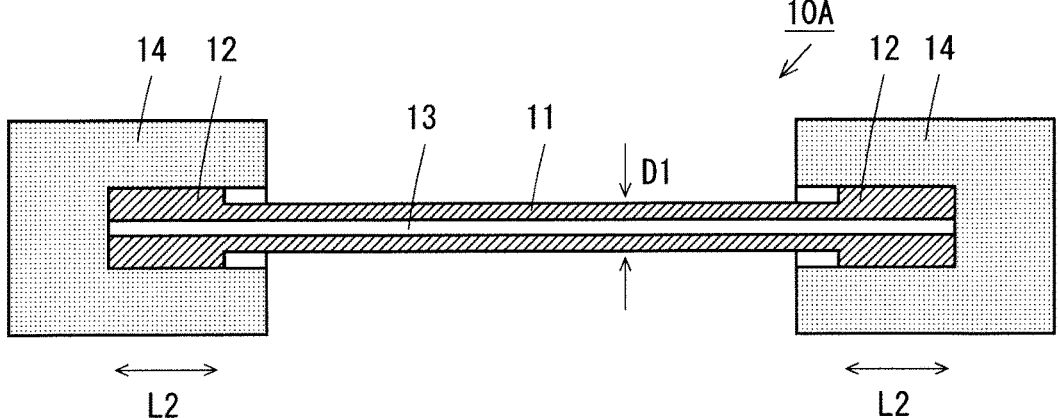
FIG. 5 is a cross sectional view for explaining one example of the step of the method of manufacturing the pipe.
Figure 6:
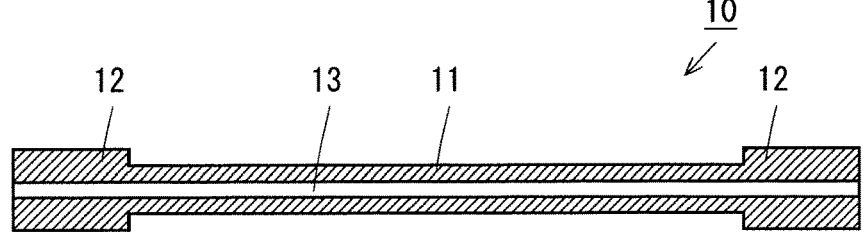
FIG. 6 is a cross sectional view for explaining one example of the step of the method of manufacturing the pipe.

As shown in FIG. 5, the cylindrical member 10A is etched, so that the thickness of the cylindrical member 10A, except for the portions having the length L2 at the both end portions of the cylindrical member 10A, is reduced such that the outer diameter is D1, which is smaller than D2. Thus, the etched portion of the cylindrical member 10A is the thin portion 11, and the non-etched end portions are the thick portions 12. Finally, the masks 14 are removed from the both end portions of the cylindrical member 10A. Thus, as shown in FIG. 6, the pipe 10 is completed.

(4) Effects

In the pipe 10 according to the present embodiment, the thick portions 12 located at the end portions of the thin portion 11 are attached to an LC unit of the chromatograph. Here, because the outer diameter of the thin portion 11 is smaller than the outer diameter of the thick portion 12, the flexibility of the pipe 10 is improved. Therefore, the pipe 10 can be arranged along any path. Further, even in a case in which being bent, the pipe 10 is not permanently bent (is not plastically deformed.) Further, because the thin portion 11 and the thick portions 12 are integrally formed of a signal member, it is not necessary to perform a process of bonding the thin portion 11 and the thick portions 12 to each other. As a result, it is possible to improve the handleability of the pipe 10 at low cost.

In the present example, the thin portion 11 and the thick portions 12 are integrally formed of a metallic material. In this case, it is possible to easily improve the durability of the pipe 10. Further, because the flexibility of the pipe 10 is improved, even in a case in which the thin portion 11 and the thick portions 12 are formed of a metallic material, it is possible to improve the handleability of the pipe 10.

The outer diameter of the thin portion 11 is not less than 0.3 times and not more than 0.7 times of the outer diameter of the thick portion 12. In this case, it is possible to easily improve the flexibility of the pipe 10 while maintaining the durability of the pipe 10. In the example, the outer diameter of the thick portion 12 is 1.6 mm, and the outer diameter of the thin portion 11 is 0.8 mm. In this case, it is possible to easily make the pipe 10 fit the connection port of an LC unit of the chromatograph 100 while maintaining the durability and flexibility of the pipe 10.

The length L1 of the pipe 10 in the axial direction is not less than 100 mm and not more than 2000 mm. In this case, the pipe 10 can be easily used for the connection between LC units of the chromatograph 100. Further, in the axial direction, the length of the thick portion 12 is not less than 20 mm and not more than 200 mm. In this case, the pipe 10 can be easily attached to the connection port of an LC unit of the chromatograph 100.

The through hole 13 (inner space) of the pipe 10 forms the flow path, and the diameter of the flow path is not less than 0.05 mm and not more than 0.5 mm. In this case, it is possible to improve the durability and flexibility of the pipe 10 while appropriately maintaining the flow rate of fluid supplied in the chromatograph 100.

(5) Reference Example

Figure 7:
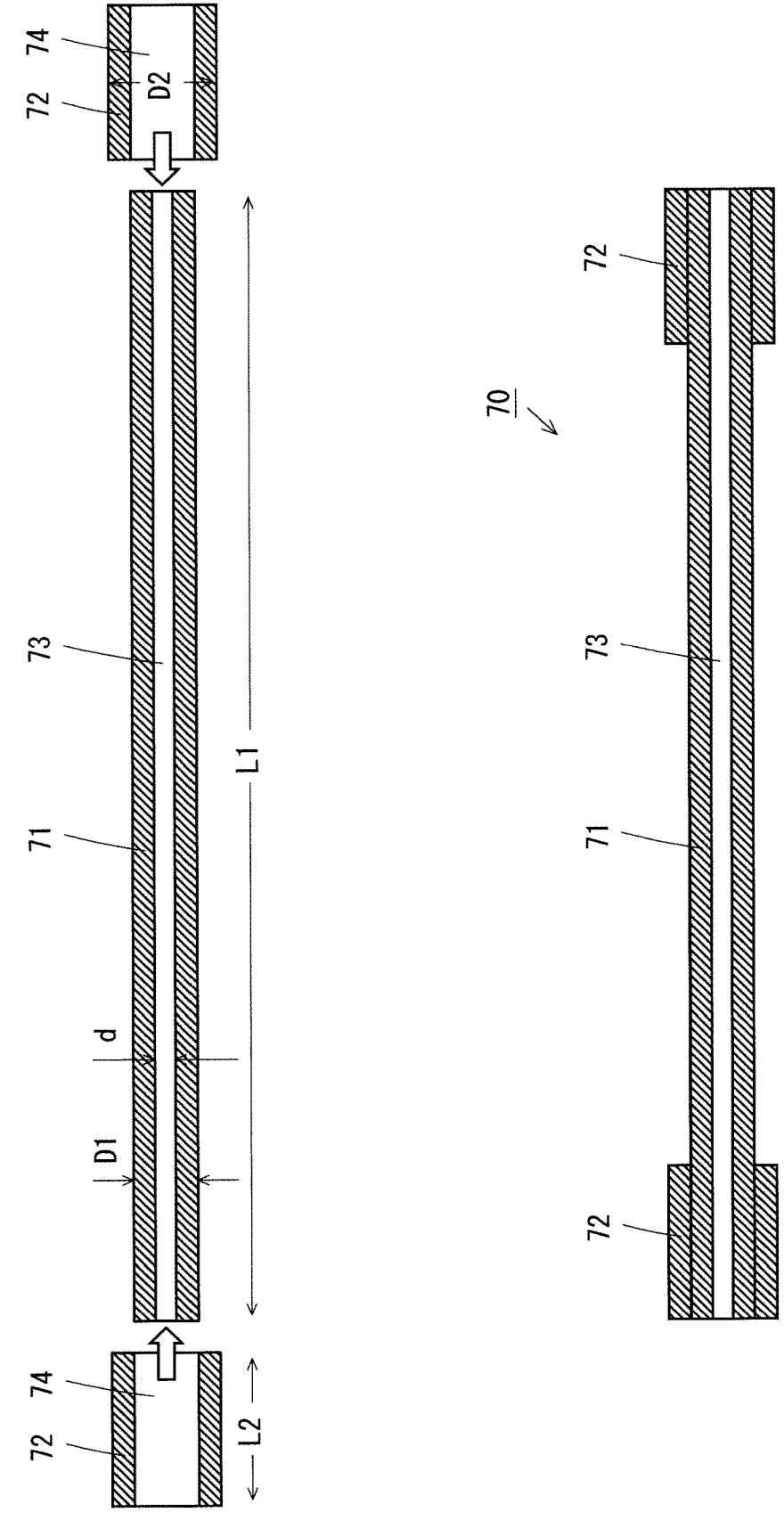
FIG. 7 is a cross sectional view for explaining a pipe and the steps of manufacturing the pipe according to a reference example.

FIG. 7 is a cross sectional view for explaining a pipe and the steps of manufacturing the pipe according to a reference example. As shown in the upper field of FIG. 7, in the method of manufacturing the pipe according to the reference example, a cylindrical member 71 and a pair of sleeve members 72 are prepared. The cylindrical member 71 and each of the sleeve members 72 are formed of stainless steel, for example.

The cylindrical member 71 and each of the sleeve members 72 are cylindrical. Therefore, a circular through hole 73 penetrating the cylindrical member 71 in the axial direction is formed in the cylindrical member 71, and a circular through hole 74 penetrating each of the sleeve members 72 in the axial direction is formed in each of the sleeve members 72. In the axial direction, the length of the cylindrical member 71 is L1, and the length of each of the sleeve members 72 is L2. The outer diameter of the cylindrical member 71 is D1, and the inner diameter of the cylindrical member 71 (the diameter of the through hole 73) is d. The outer diameter of each of the sleeve members 72 is D2, and the inner diameter of each of the sleeve members 72 (the diameter of the through hole 74) is D1.

As indicated by the outlined arrows in the upper field of FIG. 7, the pair of sleeve members 72 are respectively fitted to the both end portions of the cylindrical member 71. Next, the contact portion between the cylindrical member 71 and each of the sleeve members 72 is brazed with gold (Au), for example. Subsequently and sequentially, burns are removed, and the end surfaces of the cylindrical member 71 and each of the sleeve members 72 are polished. Thus, as shown in the lower field of FIG. 7, the pipe 70 in which the pair of sleeve members 72 are respectively bonded to the both end portions of the cylindrical member 71 is completed.

With the method of manufacturing the pipe 70 according to the reference example, the pipe 70 having a shape similar to that of the pipe 10 of FIG. 2 can be manufactured. However, in the process of manufacturing the pipe 70, brazing, removal of burns, polishing and the like need to be performed. In this case, the manufacturing cost of the pipe 70 is increased. Therefore, it is difficult to improve the handleability of the pipe 70 at low cost.

(6) Other Embodiments (a) While the pipe 10 is formed of stainless steel in the above-mentioned embodiment, the embodiment is not limited to this. The pipe 10 may be formed of another metallic material such as titanium. Alternatively, the pipe 10 may be formed of another material such as a resin material as long as the material has corrosion resistance.

(b) While the outer diameter of the thin portion 11 is not less than 0.3 times and not more than 0.7 times of the outer diameter of the thick portion 12 in the above-mentioned embodiment, the embodiment is not limited to this. The outer diameter of the thin portion 11 may be larger than 0.7 times or smaller than 0.3 times of the outer diameter of the thick portion 12 as long as being smaller than the outer diameter of the thick portion 12.

While the outer diameter of the thick portion 12 is 1.6 mm and the outer diameter of the thin portion 11 is 0.8 mm in the above-mentioned embodiment, the embodiment is not limited to this. As long as the pipe 10 fits the connection port of an LC unit of the chromatograph 100, the outer diameter of the thick portion 12 does not have to be 1.6 mm, and the outer diameter of the thin portion 11 does not have to be 0.8 mm.

(c) While the length of the pipe 10 is not less than 100 mm and not more than 2000 mm in the above-mentioned embodiment, the embodiment is not limited to this. The pipe 10 may be shorter than 100 mm or longer than 2000 mm as long as the pipe 10 can be connected between LC units of the chromatograph 100.

While the length of the thick portion 12 is not less than 20 mm and not more than 200 mm in the above-mentioned embodiment, the embodiment is not limited to this. The thick portion 12 may be shorter than 20 mm or longer than 200 mm as long as the pipe 10 can be attached to the connection port of an LC unit of the chromatograph 100.

(d) While the diameter of the flow path (the diameter of the through hole 13) is not less than 0.05 mm and not more than 0.5 mm in the above-mentioned embodiment, the embodiment is not limited to this. The diameter of the flow path may be smaller than 0.05 mm or larger than 0.5 mm.

(e) While the pipe 10 has the pair of thick portions 12 respectively located at the both end portions of the thin portion 11 in the above-mentioned embodiment, the embodiment is not limited to this. The pipe 10 may only have the thick portion 12 located at one end portion of the thin portion 11 and does not have to have the thick portion 12 located at the other end portion of the thin portion 11.

(7) Aspects

It is understood by those skilled in the art that the plurality of above-mentioned illustrative embodiments are specific examples of the below-mentioned aspects.

(Item 1) A pipe for a chromatograph according to one aspect, the pipe being used in a chromatograph, may include a thin portion extending in one direction, and a thick portion located at an end portion of the thin portion in the one direction, wherein the thin portion and the thick portion may be integrally formed of a single member, and an outer diameter of the thin portion may be smaller than an outer diameter of the thick portion.

In the pipe for a chromatograph, the thick portion located at the end portion of the thin portion is attached to a unit of the chromatograph. Here, because the outer diameter of the thin portion is smaller than the outer diameter of the thick portion, the flexibility of the pipe for a chromatograph is improved. Therefore, the pipe for a chromatograph can be arranged along any path. Further, even in a case in which being bent, the pipe for a chromatograph is not permanently bent (is not plastically deformed.) Further, because the thin portion and the thick portion are integrally formed of a single member, it is not necessary to perform a process of bonding the thin portion and the thick portion to each other. As a result, it is possible to improve the handleability of the pipe for a chromatograph at low cost.

(Item 2) The pipe for a chromatograph according to item 1, wherein the thin portion and the thick portion may be formed of a metallic material.

In this case, it is possible to easily improve the durability of the pipe for a chromatograph. Further, because the flexibility of the pipe for a chromatograph is improved, even in a case in which the thin portion and the thick portion are formed of a metallic material, it is possible to improve the handleability of the pipe for a chromatograph.

(Item 3) The pipe for a chromatograph according to item 1 or 2, wherein the outer diameter of the thin portion may be not less than 0.3 times and not more than 0.7 times of the outer diameter of the thick portion.

In this case, it is possible to easily improve the flexibility of the pipe for a chromatograph while maintaining the durability of the pipe for a chromatograph.

(Item 4) The pipe for a chromatograph according to item 3, wherein the outer diameter of the thick portion may be 1.6 mm, and the outer diameter of the thin portion may be 0.8 mm.

In this case, it is possible to easily make the pipe for a chromatograph fit the chromatograph while maintaining the durability and flexibility of the pipe for a chromatograph.

(Item 5) The pipe for a chromatograph according to any one of items 1 to 4, wherein a length in the one direction may be not less than 100 mm and not more than 2000 mm.

In this case, it is possible to easily use the pipe for a chromatograph for the connection between units of the chromatograph.

(Item 6) The pipe for a chromatograph according to any one of items 1 to 5, wherein a length of the thick portion may be not less than 20 mm and not more than 200 mm in the one direction.

In this case, it is possible to easily attach the pipe for a chromatograph to the chromatograph.

(Item 7) The pipe for a chromatograph according to any one of items 1 to 6, wherein an inner space of the pipe for a chromatograph may form a flow path, and a diameter of the flow path may be not less than 0.05 mm and not more than 0.5 mm.

In this case, it is possible to improve the durability and flexibility of the pipe for a chromatograph while appropriately maintaining the flow rate of fluid supplied in the chromatograph.

(Item 8) A method of manufacturing a pipe for a chromatograph according to another aspect, the pipe being used in a chromatograph, may include the steps of forming a mask at an end portion of a cylindrical member extending in one direction, and reducing a thickness of the cylindrical member except for the end portion by a predetermined amount by etching the cylindrical member.

With the method of manufacturing the pipe for a chromatograph, the pipe for a chromatograph in which a thick portion and a thin portion having an outer diameter smaller than the outer diameter of the thick portion are integrally formed of a single member is manufactured. Thus, it is possible to improve the handleability of the pipe for a chromatograph at low cost.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A method of manufacturing a pipe for a chromatograph, the pipe being used in a chromatograph, including the steps of:

forming a mask at an end portion of a cylindrical member extending in one direction; and reducing a thickness of the cylindrical member except for the end portion by a predetermined amount by etching the cylindrical member.

2. The method of claim 1, wherein the cylindrical member is formed of a metallic material.

3. The method of claim 1, wherein an outer diameter of the reduced thickness portion is not less than 0.3 times and not more than 0.7 times of an outer diameter of the end portion.

4. The method of claim 3, wherein the outer diameter of the end portion is 1.6 mm, and the outer diameter of the reduced thickness portion is 0.8 mm.

5. The method of claim 1, wherein a length in the one direction is not less than 100 mm and not more than 2000 mm.

6. The method of claim 1, wherein a length of the end portion is not less than 20 mm and not more than 200 mm in the one direction.

7. The method of claim 1, wherein an inner space of the pipe for the chromatograph forms a flow path, and a diameter of the flow path is not less than 0.05 mm and not more than 0.5 mm.

* * * * *